Nov. 26, 1929.         G. JOHNSON         1,737,537
SEPARABLE FASTENER
Filed June 28, 1928

Inventor:
Gustav Johnson
by Emery, Booth, Janney & Varney
Attys

Patented Nov. 26, 1929

1,737,537

UNITED STATES PATENT OFFICE

GUSTAV JOHNSON, OF WEST ROXBURY, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE FASTENER

Application filed June 28, 1928. Serial No. 289,039.

My invention aims to provide improvements in separable fasteners and particularly separable fasteners which are adapted to be separated by pulling on a flexible medium at a predetermined side of the fastener assembly.

Referring to the preferred embodiment of my invention, as illustrated by the drawings:—

Referring to the embodiment of my invention illustrated by the drawings, I have shown a combination stud and socket fastener which is preferably of the so-called "flush-type," particularly, though not exclusively, adapted for securing a flexible medium to a rigid medium and adapted to be separated by a pull exerted upon the lower edge of the flexible medium.

Figure 2:
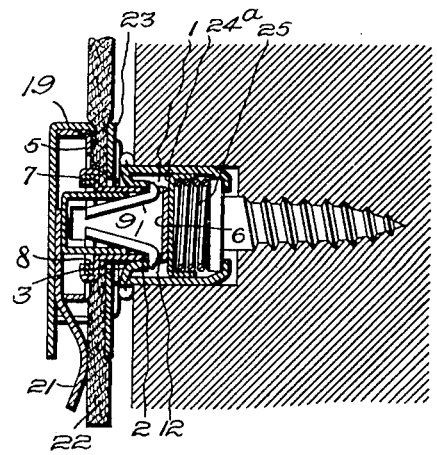
Fig. 2 is a section taken on the line 2—2 of Figure 1 with parts of the fastener assembly being shown in elevation.
Figure 3:
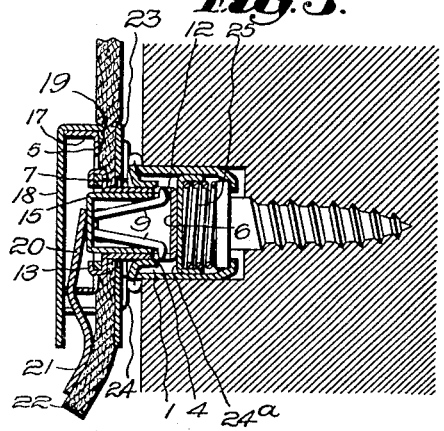
Fig. 3 is a section similar to that shown in Fig. 2 but showing the relation of the parts when the lower edge of the flexible carrying medium is pulled to act upon the means which operate to disconnect the jaw means from the socket prior to separation of the fastener.

The socket 1, which I have illustrated in Figs. 2 and 3, is substantially the same as that shown and described in the United States Letters Patent No. 1,625,406 issued to Andrew G. Anderson April 19, 1927. The socket member illustrated is provided with a relatively wide wall 2 at the stud-receiving aperture 3. This wall 2 terminates abruptly to provide an annular shoulder 4, with which the jaw portions of the stud may be engaged as hereinafter more fully described.

The stud assembly is of the "latch type" having means arranged in a simple manner and cooperating so that a pull on a predetermined side of a flexible stud support will operate to permit disengagement of the stud from a socket.

In the stud assembly illustrated I have provided a plate portion 5 having a hollow boss portion 6 extending therefrom to provide a socket-engaging projection. The plate portion 5 is provided with a depression 7 into which is placed the base-like portion 8 of a latch-presenting socket-engaging element. This element has a pair of diverging arms 9 connected to the base-like portion 8 by means of the connecting portions 10 and each arm is provided at its free end with a latch or jaw portion 11. The jaw portions 11 pass through openings 12 in the side wall of the boss portion 6 and are thereby adapted to engage behind the shoulder 4 of the socket 1 (Fig. 2) to lock the stud and socket together.

The latch-presenting element is preferably formed from a single piece of wire (Figs. 4 and 5) which is rectangular in cross-section (Fig. 2) and is held in assembled relation to the plate portion 5 by means of ears 13 pressed from the plate portion 5 and bent over the base-like portion 8, as best shown in Figs. 2 and 3.

Figure 4:
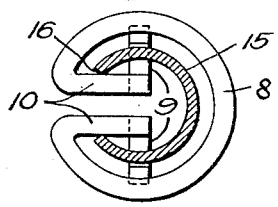
Fig. 4 is an enlarged detail view showing in end elevation the one-piece jaw-presenting element and showing in section a portion of the axially movable member.
Figure 5:
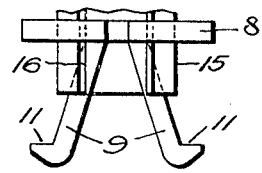
Fig. 5 is an elevation view of the parts shown in Fig. 4.

Within the hollow boss portion 6 I have assembled an axially movable element 15 which is open at one end and has a slot 16 at one side to permit the open end to pass beyond the base-like portion 8 of the latch-presenting element for engagement with the arms 9. The slot 16 is provided to permit the axially movable element 15 to pass by the connecting portions 10, as best illustrated in Fig. 4.

Figure 1:
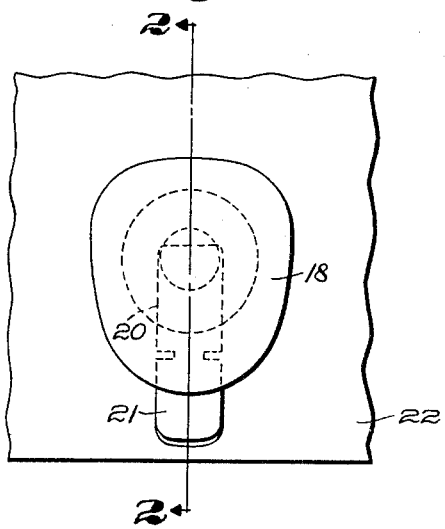
Figure 1 is a front elevation of the fastener assembly showing the depending operating lever.

The plate portion 5 has a peripheral wall 17 to which is secured a cover plate 18 having portions 19 bent beneath the plate portion 5 (Figs. 2 and 3) to secure the two parts together. A lever 20 is pivotally mounted upon the wall 17 and is held between the wall 17 and the cover plate 18 (Figs. 1 and 2). This lever 20 is located transverse to the axis of the axially movable part and has one end bearing thereagainst. The other end is in the form of a finger 21 which lies close to the flexible carrying medium 22, as shown in Fig. 2.

The parts of the stud thus far described are preferably assembled as a unit before attachment to the carrying medium 22. This unit may be attached to the carrying medium by securing the casing part, formed by the plates 5 and 18, to the front face thereof with the hollow boss portion 6 passing through an opening in the carrying medium and through an opening in a plate 23 secured against the inner face of the carrying medium. Prongs 24 extend from the cover plate 18 through the carrying medium and through the plate 23 and are clenched against the plate 23 to hold the parts assembled to the carrying medium. The formation of the casing part and mounting of the lever 20 may be substantially the same as described and illustrated in the United States Patent No. 1,675,097 issued to Didrick Dyresen June 26, 1928. However, it is to be understood that the part 20 which is operated by a pull on the carrying medium 22 may be slidably mounted and, therefore, I do not wish to be limited to a pivoted member 20.

When the stud and socket are engaged, as shown in Fig. 2, the closure plate 24, in the socket, is forced away from the shoulder 4 against the pressure of the spring 25 by the boss portion 6 and the jaw portions 11 engage the shoulder 4 and lock the stud and socket against accidental separation. The boss portion 6 also cooperates with the wall 2 of the socket to prevent any substantial tipping of the stud relative to the socket.

While the fastener members are thus engaged the axially movable portion and lever 20 will be forced into their normal positions by the arms 9 which are yieldable and normally spring away from each other and expose the jaws 11 at the outer face of the side wall of the boss portion 6.

To disengage the fastener members it is merely necessary to pull outwardly upon the lower edge of the carrying medium 22. This action tips the lever 20 about its pivot and moves the axially movable element 15 toward the jaws 11 thereby engaging the arms and squeezing them together to draw the jaws 11 into the boss portion 6, as illustrated in Fig. 3. When the jaws 11 are released the spring 25 in the socket will urge the closure plate 24 toward the stud-receiving aperture 3 thereby ejecting the boss from the aperture.

Figure 6:
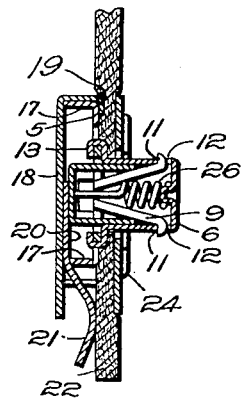
Fig. 6 is a section of a stud member similar to that shown in Figs. 2 and 3, but showing an additional spring inserted between the axially movable member and the end of the hollow boss portion to assist in returning the operating parts to their normal positions.

In Fig. 6, I have illustrated a stud member of the type and construction above described, in connection with Figs. 1 through 5, with the addition of a spring 26 interposed between the bottom of the axially movable element 15 and the end wall of the boss portion 6. This spring may be added if it is necessary to assist in returning the axially movable element 15 and lever 22 to their normal positions.

While I have illustrated and described preferred embodiments of my invention I do not wish to be limited thereby as the scope of my invention is best defined by the following claims.

Claims:

1. A snap fastener stud assembly having latch-presenting means providing a latch portion for engagement with a socket, attaching means securing said latch-presenting means to a carrying medium, an axially movable element operable relative to said latch-presenting means for disengaging the latch portion from a socket, and a member comprising a part of the stud assembly and located in a plane substantially transverse to the axis of the axially movable element and parallel to the carrying medium, said member providing a connection between the axially movable element and the carrying medium whereby a pull on the carrying medium at a predetermined side of the stud assembly will move said member which, in turn, will act to operate said axially movable element.

2. A snap fastener stud assembly having latch-presenting means providing a latch portion for engagement with a socket, attaching means securing said latch-presenting means to a carrying medium, an axially movable element operable relative to said latch-presenting means for disengaging the latch portion from a socket, and a lever member pivotally assembled to comprise a part of the stud assembly and located in a plane substantially transverse to the axis of the axially movable element and parallel to the carrying medium, said member providing a connection between the axially movable element and the carrying medium whereby a pull on the carrying medium at a predetermined side of the stud assembly will move said lever member which, in turn, will act to operate said axially movable element.

3. A snap fastener stud assembly comprising a part having a hollow boss portion for passage into a stud-receiving aperture, means presenting a latch through an aperture in the side wall of said boss portion for fastening the stud assembly with a socket, attaching means securing said part and said means to a flexible support, an axially movable element in said hollow boss cooperating with said means presenting the latch, and a member assembled as a part of the stud assembly, said member being substantially parallel with the flexible support and providing an operable connection between the flexible support and the axially movable element, whereby when said flexible support is pulled outwardly at a predetermined side the said member will move the axially movable element to act upon said means and draw the latch portion into the hollow boss portion.

4. A snap fastener stud assembly comprising a part having a hollow boss portion for passage into a stud-receiving aperture, means presenting a latch through an aperture in the side wall of said boss portion for fastening the stud assembly with a socket, attaching means securing said part and said means to a flexible support, an axially movable element in said hollow boss cooperating with said means presenting the latch, a member assembled as a part of the stud assembly, said member being substantially parallel with the flexible support and providing an operable connection between the flexible support and the axially movable element, whereby when said flexible support is pulled outwardly at a predetermined side the said member will move the axially movable element to act upon said means and draw the latch portion into the hollow boss portion and yieldable means normally urging said axially movable element and said member away from said latch portion to permit the latch portion to project beyond the outer wall of the said boss portion.

5. A snap fastener stud assembly comprising a part having a hollow boss portion for passage into a stud-receiving aperture, a one-piece member assembled with said part presenting the hollow boss portion and presenting a latch through an aperture in the side wall of said boss portion for fastening the stud assembly with a socket, attaching means securing said part and said means to a flexible support, an axially movable element in said hollow boss cooperating with said means presenting the latch, and a member assembled as a part of the stud assembly, said member being substantially parallel with the flexible support and providing an operable connection between the flexible support and the axially movable element, whereby when said flexible support is pulled outwardly at a predetermined side the said member will move the axially movable element to act upon said means and draw the latch portion into the hollow boss portion.

6. A snap fastener stud assembly comprising a part having a hollow boss portion for passage into a stud-receiving aperture, a one-piece member assembled with said part presenting the hollow boss portion and having a pair of diverging arms each presenting a latch through an aperture in the side wall of said boss portion for fastening the stud assembly with a socket, attaching means securing said part and said means to a flexible support, an axially movable element in said hollow boss cooperating with said means presenting the latch, and a member assembled as a part of the stud assembly, said member being substantially parallel with the flexible support and providing an operable connection between the flexible support and the axially movable element, whereby when said flexible support is pulled outwardly at a predetermined side the said member will move the axially movable element to act upon said means and draw the latch portion into the hollow boss portion.

7. A snap fastener stud assembly comprising a part having a hollow boss portion for passage into a stud-receiving aperture, a one-piece member assembled with said part presenting the hollow boss portion and having a pair of diverging arms each presenting a latch through an aperture in the side wall of said boss portion for fastening the stud assembly with a socket, attaching means securing said part and said means to a flexible support, an axially movable element in said hollow boss cooperating with said means presenting the latch, and a pivotally mounted member assembled as a part of the stud assembly, said member being substantially parallel with the flexible support and providing an operable connection between the flexible support and the axially movable element, whereby when said flexible support is pulled outwardly at a predetermined side the said member will move the axially movable element to act upon said means and draw the latch portion into the hollow boss portion.

8. A snap fastener stud comprising a part presenting a hollow boss portion 6, a one-piece wire member having yieldably mounted latch portions 11—11 extending through openings 12—12 in the side wall of the boss portion 6, an axially movable element 15 for moving the latch portions 11—11 into the hollow boss portion 6 and an operable member 20 assembled as a part of the stud in a plane transverse to the axis of the axially movable element 15 and having one end positioned to engage and move said axially movable element 15 toward said latch portions.

In testimony whereof, I have signed my name to this specification.

GUSTAV JOHNSON.